(12) United States Patent
Kim et al.

(10) Patent No.: US 10,593,966 B2
(45) Date of Patent: Mar. 17, 2020

(54) SOLID OXIDE FUEL CELL AND METHOD FOR MANUFACTURING SAME

(71) Applicant: LG CHEM, LTD., Seoul (KR)

(72) Inventors: Jong Woo Kim, Daejeon (KR);
Kwangwook Choi, Daejeon (KR);
Dong Oh Shin, Daejeon (KR);
Changseok Ryoo, Daejeon (KR);
Gyunjoong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 44 days.

(21) Appl. No.: 15/890,230

(22) Filed: Feb. 6, 2018

(65) Prior Publication Data

US 2018/0159149 A1 Jun. 7, 2018

Related U.S. Application Data

(62) Division of application No. 14/908,057, filed as application No. PCT/KR2014/006980 on Jul. 30, 2014, now Pat. No. 9,923,213.

(30) Foreign Application Priority Data

Jul. 31, 2013 (KR) .................. 10-2013-0091212

(51) Int. Cl.
*H01M 8/10* (2016.01)
*H01M 8/0282* (2016.01)
(Continued)

(52) U.S. Cl.
CPC ........ *H01M 8/0282* (2013.01); *C04B 35/486* (2013.01); *C04B 35/50* (2013.01); *H01M 4/8889* (2013.01); *H01M 8/1004* (2013.01); *H01M 8/124* (2013.01); *H01M 8/126* (2013.01); *H01M 8/1246* (2013.01);
(Continued)

(58) Field of Classification Search
CPC ............ H01M 8/0282; H01M 8/1004; H01M 8/1246; H01M 8/1253; H01M 8/126; H01M 8/1266; H01M 4/8889; H01M 8/124; H01M 2300/0077; H01M 2300/0074; H01M 2008/1293; C04B 35/486; C04B 35/50;
(Continued)

(56) References Cited

U.S. PATENT DOCUMENTS

2002/0177025 A1* 11/2002 Kushibiki ............ H01M 8/241
429/481
2011/0073180 A1 3/2011 Park et al.
(Continued)

FOREIGN PATENT DOCUMENTS

JP H07-22211 A 1/1995
JP 11-031516 A 2/1999
(Continued)

OTHER PUBLICATIONS

Li (Effect of B2O3—Bi2O3—PbO frit on the performance of LaBaCo2O cathode for intermediate-temperature solid oxide fuel cells, International Journal of Hydrogen Energy vol. 37, Issue 21, Nov. 2012, pp. 16117-16122).*
(Continued)

*Primary Examiner* — Cynthia K Walls

(57) ABSTRACT

The present specification relates to a solid oxide fuel cell and a method for manufacturing the same.

6 Claims, 5 Drawing Sheets

(51) Int. Cl.
*H01M 8/124* (2016.01)
*H01M 4/88* (2006.01)
*C04B 35/486* (2006.01)
*C04B 35/50* (2006.01)
*H01M 8/1004* (2016.01)
*H01M 8/1246* (2016.01)
*H01M 8/1253* (2016.01)
*H01M 8/126* (2016.01)

(52) U.S. Cl.
CPC ....... *H01M 8/1253* (2013.01); *H01M 8/1266* (2013.01); *C04B 2235/3224* (2013.01); *C04B 2235/3225* (2013.01); *C04B 2235/3229* (2013.01); *C04B 2235/365* (2013.01); *H01M 2008/1293* (2013.01); *H01M 2300/0074* (2013.01); *H01M 2300/0077* (2013.01); *Y02P 70/56* (2015.11)

(58) Field of Classification Search
CPC ...... C04B 2235/365; C04B 2235/3229; C04B 2235/3225; C04B 2235/3224; Y02P 70/56
See application file for complete search history.

(56) References Cited

U.S. PATENT DOCUMENTS

| | | | |
|---|---|---|---|
| 2012/0318022 A1 | 12/2012 | Nonnet et al. | |
| 2014/0010953 A1* | 1/2014 | Ramousse | H01M 8/1253 427/115 |

FOREIGN PATENT DOCUMENTS

| | | |
|---|---|---|
| JP | 2002-015754 A | 1/2002 |
| JP | 2003-123789 A | 4/2003 |
| JP | 2008-257890 A | 10/2008 |
| KR | 10-2012-0104511 A | 9/2012 |

OTHER PUBLICATIONS

International Search Report and Written Opinion for International Patent Application No. PCT/KR2014/006980 filed Jul. 30, 2014.

* cited by examiner

[Fig. 1]
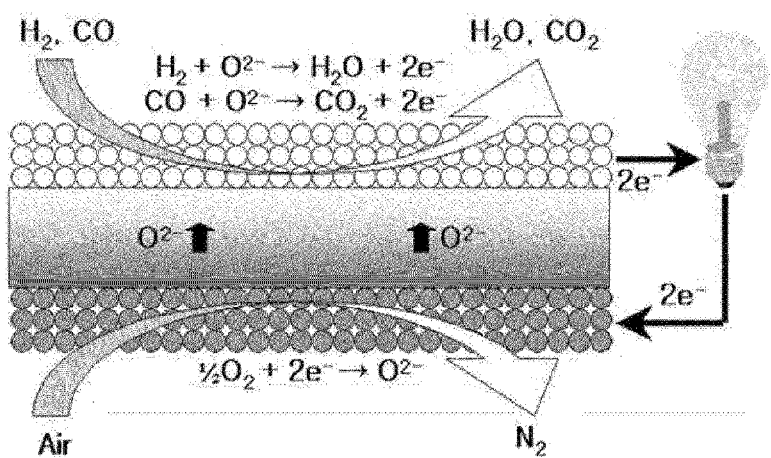
[Fig. 2]
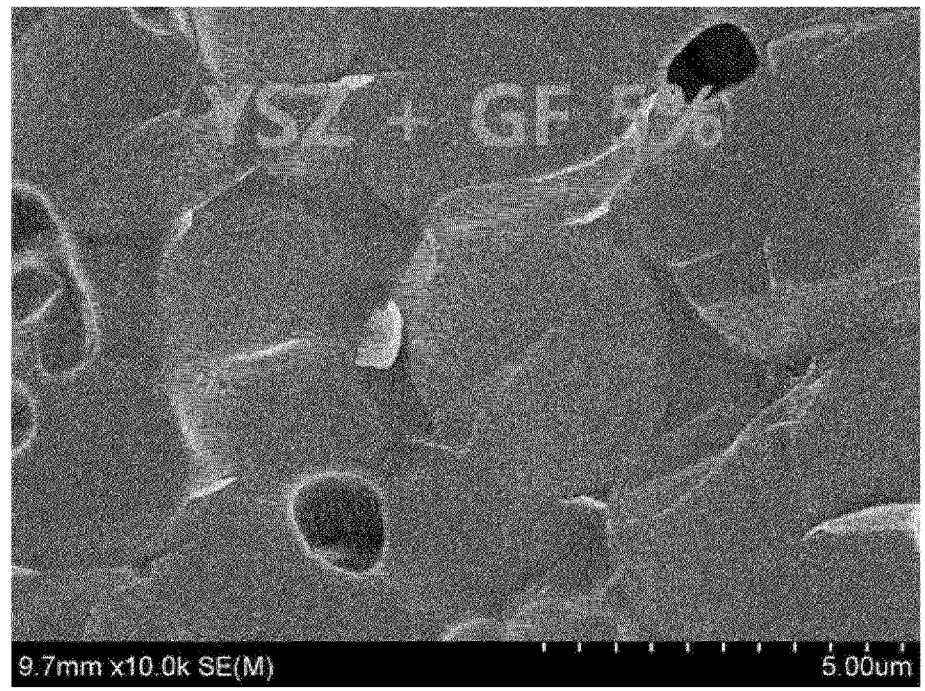

[Fig. 3]
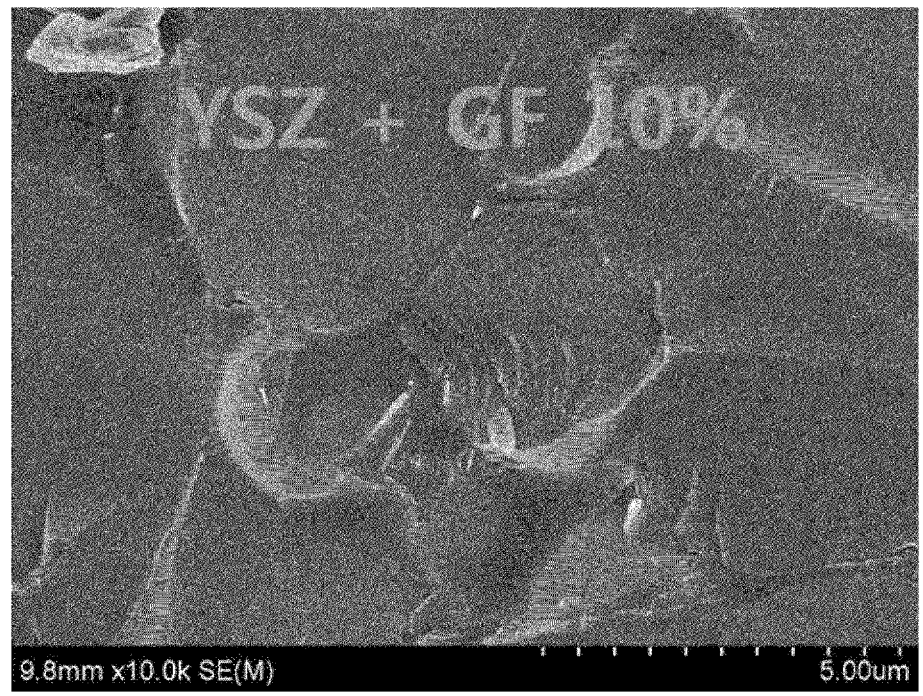
[Fig. 4]
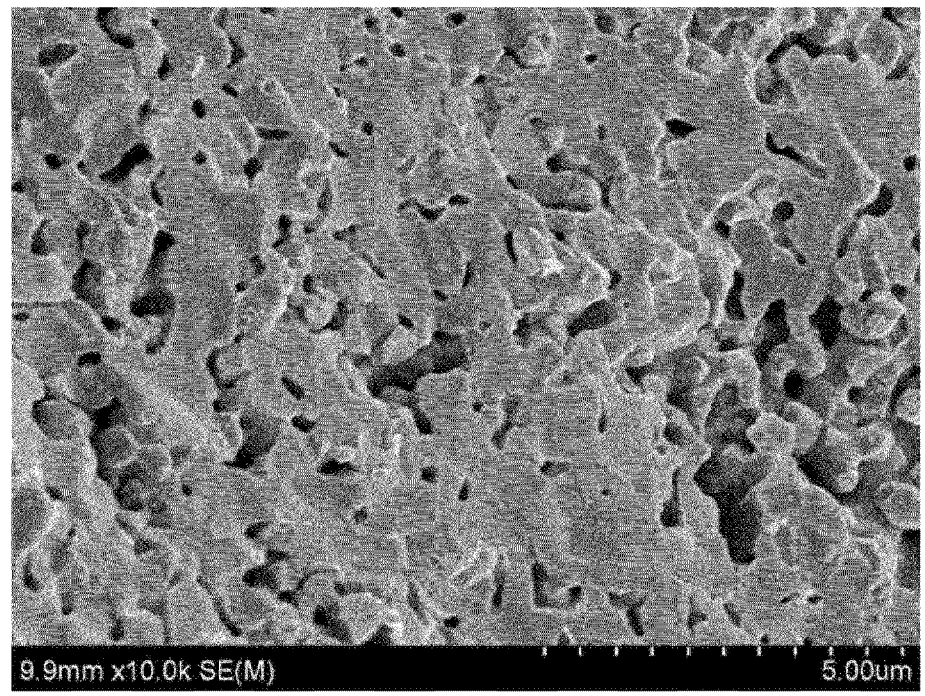

[Fig. 5]
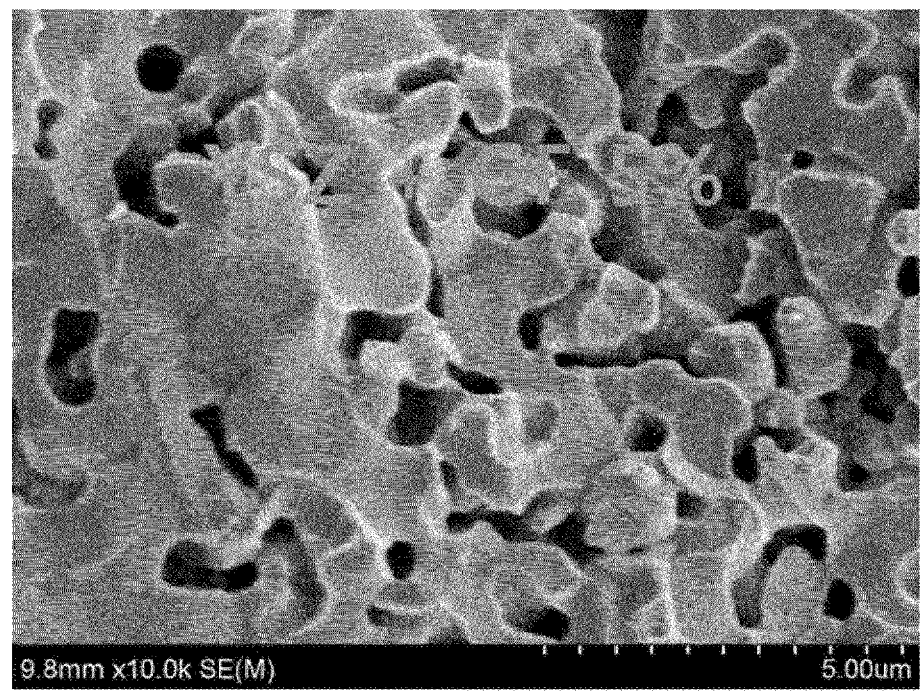
[Fig. 6]
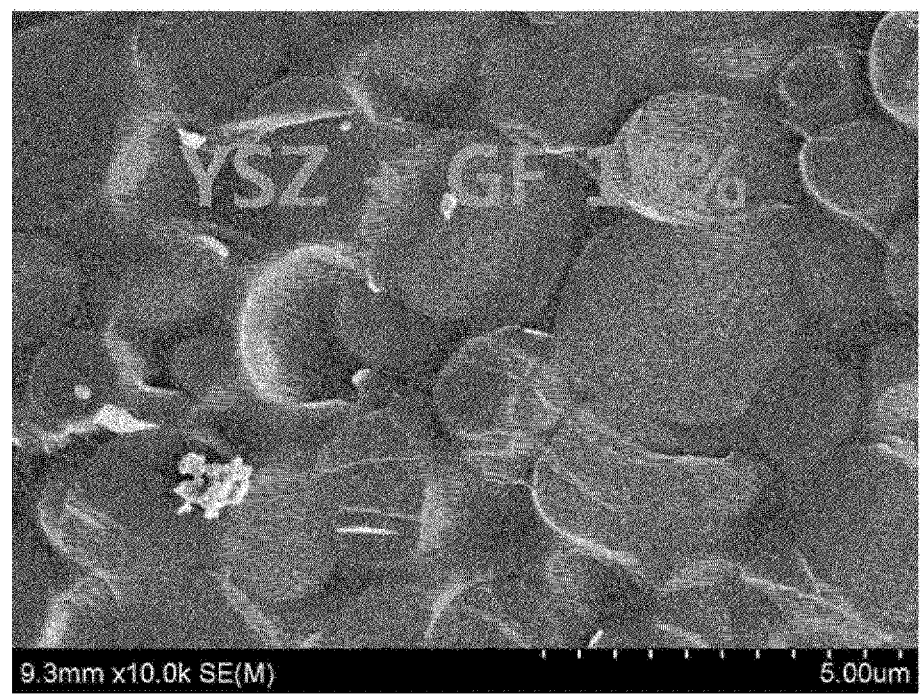

【Fig. 7】
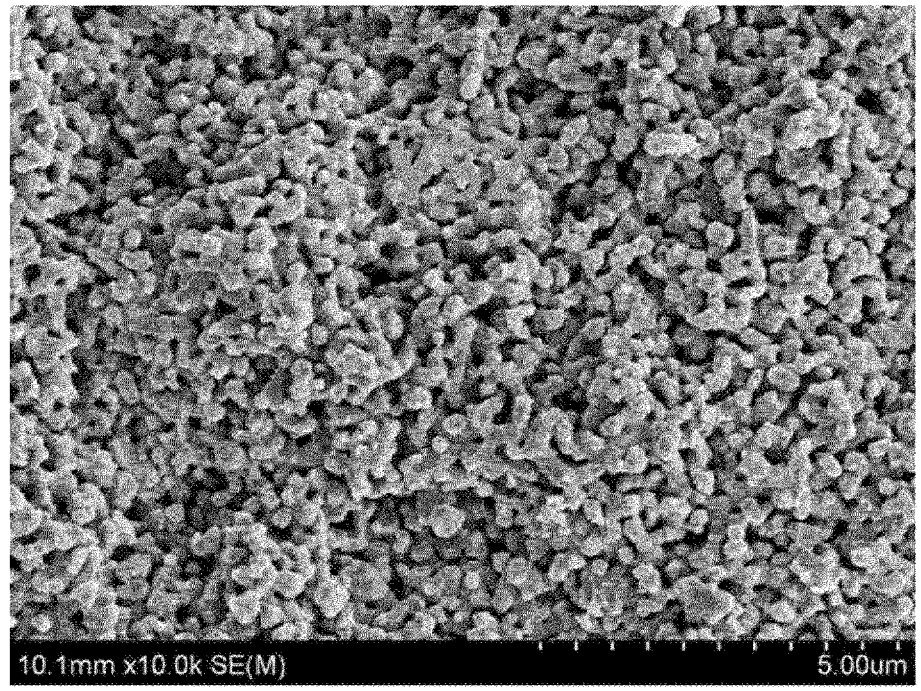
【Fig. 8】
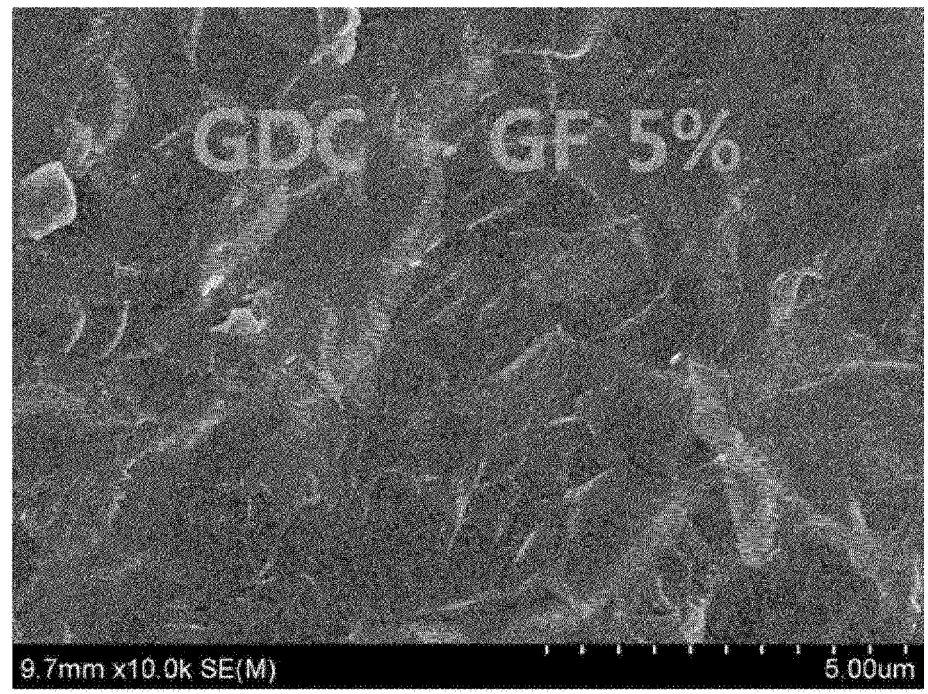

【Fig. 9】
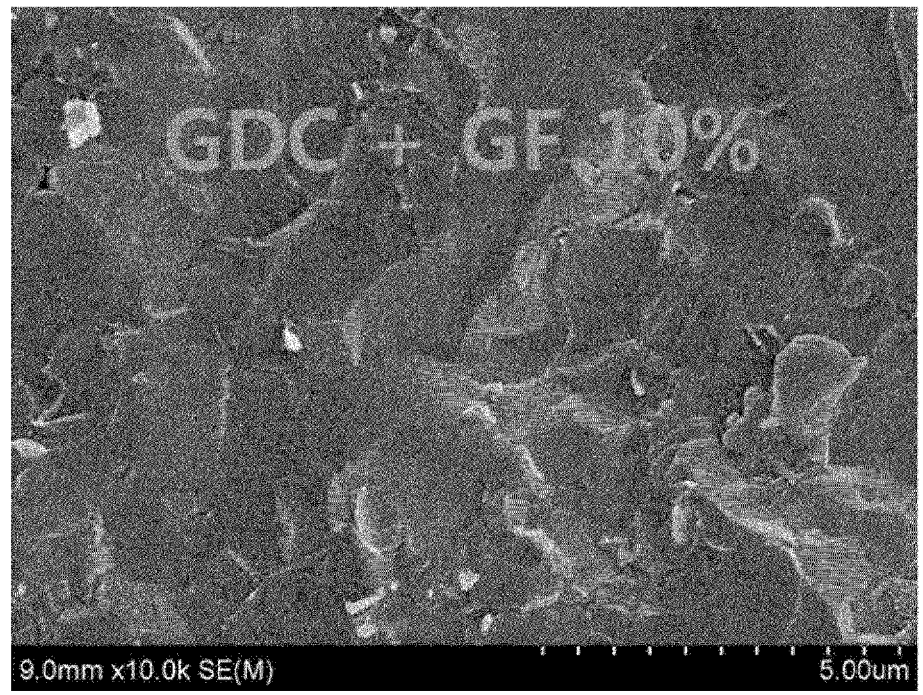
【Fig. 10】
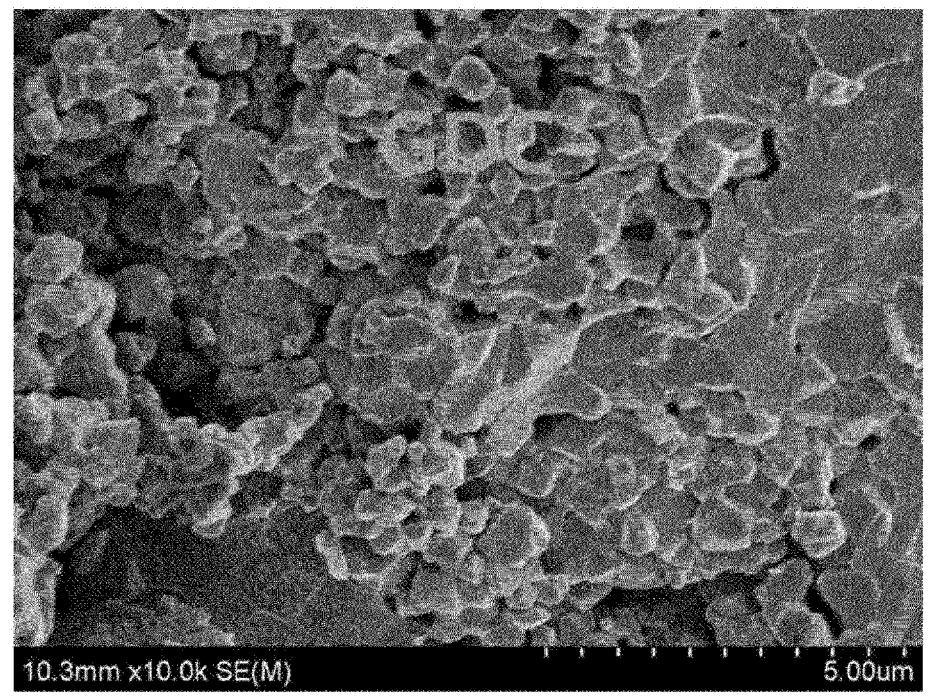

SOLID OXIDE FUEL CELL AND METHOD FOR MANUFACTURING SAME

TECHNICAL FIELD

The present specification is a divisional of U.S. patent application Ser. No. 14/908,057, filed on Jan. 27, 2016, which is a U.S. National Stage of International Patent Application No. PCT/KR2014/006980 filed Jul. 30, 2014, which claims priority to and the benefits of Korean Patent Application No. 10-2013-0091212, filed with the Korean Intellectual Property Office on Jul. 31, 2013, the entire contents of which are incorporated herein by reference.

The present specification relates to a solid oxide fuel cell and a method for manufacturing the same.

BACKGROUND ART

A solid oxide fuel cell (SOFC) referred to as a third-generation fuel cell is a fuel cell using a solid oxide allowing permeation of oxygen or hydrogen ions as an electrolyte, and was first operated by Bauer and Preis in 1937. An SOFC operates at the highest temperature (700° C. to 1,000° C.) in existing fuel cells. All constituents are made of solid, and accordingly, the structure is simpler compared to other fuel cell structures, and there are no problems of electrolyte loss and replenishment, and corrosion. In addition, precious metal catalysts are not required since an SOFC operates at a high temperature, and fuel supply through direct internal reforming is readily obtained. An SOFC also has an advantage in that heat combined generation using waste heat is possible since the SOFC emits high temperature gas. Due to such advantages, researches on SOFCs have been actively carried out with a purpose of commercialization in the early $21^{st}$ century.

General SOFCs are formed with an oxygen ion conductive electrolyte, and an air electrode (cathode) and a fuel electrode (anode) located on both sides of the electrolyte. A basic operation principle of an SOFC is that oxygen ions produced from an oxygen reduction reaction in an air electrode migrate to a fuel electrode through an electrolyte, and then react again with hydrogen supplied to the fuel electrode to produce water, and herein, electrons are produced in the fuel electrode, and electrons are consumed in the air electrode, and therefore, a current is generated by connecting the two electrodes. FIG. 1 is a diagram showing one example of an operation principle of a solid oxide fuel cell. In other words, oxygen introduced through an air electrode and hydrogen introduced from a fuel electrode reacts to generate a current.

An air electrode and a fuel electrode of an SOFC need to have high porosity, and an electrolyte provided in between needs to have a dense structure. Accordingly, a baking process is individually carried out in order to prepare these, and in the case of an electrolyte that needs to have a dense structure, baking needs to be carried out at a particularly high temperature. As a result, there have been problems in that distortion between each constitution occurs due to differences in the sintering temperatures, and process costs increase since each constitution is separately baked.

PRIOR ART DOCUMENTS

Patent Documents

US Patent Application Laid-Out Publication No. 2011-0073180.

DISCLOSURE

Technical Problem

In view of the above, the present specification provides a solid oxide fuel cell and a method for manufacturing the same.

Technical Solution

One embodiment of the present specification provides a solid oxide fuel cell including an air electrode; a fuel electrode; and an electrolyte provided between the air electrode and the fuel electrode, wherein at least one of the air electrode, the fuel electrode and the electrolyte includes a glass frit or a material derived from the glass frit.

Another embodiment of the present specification provides a method for manufacturing a solid oxide fuel cell including preparing an air electrode precursor; preparing an electrolyte precursor; preparing a fuel electrode precursor; providing the electrolyte precursor between the air electrode precursor and the fuel electrode precursor; and baking the air electrode precursor, the electrolyte precursor and the fuel electrode precursor simultaneously, wherein at least one of the air electrode precursor, the electrolyte precursor and the fuel electrode precursor includes a glass frit.

Advantageous Effects

A solid oxide fuel cell according to one embodiment of the present specification is capable of minimizing distortion at each interface of an air electrode, an electrolyte and a fuel electrode.

In addition, a solid oxide fuel cell according to one embodiment of the present specification has an advantage in that it is capable of being manufactured through a single baking process.

Furthermore, a solid oxide fuel cell according to one embodiment of the present specification is capable of forming an electrolyte having a dense structure despite low temperature baking.

In addition, a solid oxide fuel cell according to one embodiment of the present specification has excellent process efficiency through a low temperature baking process and a single baking process.

DESCRIPTION OF DRAWINGS

FIG. 1 is a diagram showing one example of an operation principle of a solid oxide fuel cell.

FIG. 2 shows a SEM image according to Example 1.
FIG. 3 shows a SEM image according to Example 2.
FIG. 4 shows a SEM image according to Comparative Example 1.
FIG. 5 shows a SEM image according to Example 3.
FIG. 6 shows a SEM image according to Example 4.
FIG. 7 shows a SEM image according to Comparative Example 2.
FIG. 8 shows a SEM image according to Example 5.
FIG. 9 shows a SEM image according to Example 6.
FIG. 10 shows a SEM image according to Comparative Example 3.

MODE FOR DISCLOSURE

Hereinafter, the present specification will be described in more detail.

One embodiment of the present specification provides a solid oxide fuel cell including an air electrode; a fuel electrode; and an electrolyte provided between the air electrode and the fuel electrode, wherein at least one of the air electrode, the fuel electrode and the electrolyte includes a glass frit or a material derived from the glass frit.

According to one embodiment of the present specification, the glass frit or the material derived from the glass frit may be a sintering aid. Specifically, the glass frit or the material derived from the glass frit of the present specification may perform a role of lowering a sintering temperature when forming the air electrode, the fuel electrode and/or the electrolyte. In addition, the glass frit of the present specification may perform a role of facilitating sintering and thereby shortening a sintering time.

According to one embodiment of the present specification, glass frits commonly used in the art may be used without limit as the glass frit.

According to one embodiment of the present specification, the glass frit may be a non-crystalline compound. In addition, according to one embodiment of the present specification, the glass frit may mean a powder material melting, rapidly cooling, and then, when necessary, grinding a raw material of a non-crystalline compound.

According to one embodiment of the present specification, the glass frit may include one or more types selected from the group consisting of $SiO_2$, $B_2O_3$, $Al_2O_3$, $Bi_2O_3$, PbO, CaO, BaO, LiO, MgO, $Na_2O$, $K_2O$, ZnO, MnO, $ZrO_2$, $V_2O_5$, $P_2O_5$, $Y_2O_3$, SrO, GaO, $Se_2O_3$, $TiO_2$ and $La_2O_3$. The glass frit of the present specification may further include additives in addition to the above-mentioned constitutions, and general glass frits may be used without limit.

According to one embodiment of the present specification, the glass frit may include one or more types selected from the group consisting of ZnO—$SiO_2$-based, ZnO—$B_2O_3$—$SiO_2$-based, ZnO—$B_2O_3$—$SiO_2$—$Al_2O_3$-based, $Bi_2O_3$—$SiO_2$-based, $Bi_2O_3$—$B_2O_3$—$SiO_2$-based, $Bi_2O_3$—$B_2O_3$—$SiO_2$—$Al_2O_3$-based, $Bi_2O_3$—ZnO—$B_2B_2O_3$—$SiO_2$-based, $Bi_2O_3$—ZnO—$B_2O_3$—$SiO_2$—$Al_2O_3$-based and $La_2O_3$—$B_2O_3$—BaO—$TiO_2$-based glass frits.

According to one embodiment of the present specification, the glass frit may have an average particle diameter of greater than or equal to 500 nm and less than or equal to 20 μm.

When the average particle diameter of the glass frit is within the above-mentioned range, the glass frit may smoothly lower a baking temperature of the electrolyte as a sintering aid. When the average particle diameter of the glass frit is less than the above-mentioned range, melting of the glass frit becomes too quick, which may cause a problem in that the baking temperature may not be sufficiently lowered, and when the average particle diameter is greater than the above-mentioned range, there is a problem in that the glass frit may act as a defect area in the electrolyte.

According to one embodiment of the present specification, a glass transition temperature (Tg) of the glass frit may be lower than a baking temperature of the solid oxide fuel cell by 100° C. to 800° C. A glass transition temperature of the glass frit may mean a temperature at which a phase of the glass frit changes, and this may mean a temperature at which the solid state glass frit changes into a liquid state.

According to one embodiment of the present specification, the glass frit may change into a liquid state during the baking for forming a solid oxide fuel cell, and facilitate sintering of the air electrode, the fuel electrode and/or the electrolyte precursors, and lower the sintering temperature, since the temperature is lower than a baking temperature of the solid oxide fuel cell by 100° C. to 800° C.

Specifically, according to one embodiment of the present specification, the glass frit may have a glass transition temperature (Tg) of greater than or equal to 450° C. and less than or equal to 900° C.

According to one embodiment of the present specification, the electrolyte may include the glass frit or the material derived from the glass frit. The glass frit may lower a sintering temperature of the electrolyte, and performs a role of shortening a sintering time.

According to one embodiment of the present specification, the electrolyte includes the glass frit or the material derived from the glass frit, and the electrolyte may have a baking temperature lower by 1% to 50% compared to a state without the glass frit or the material derived from the glass frit. Specifically, according to one embodiment of the present specification, the electrolyte may have a baking temperature lower by 1% to 15% or by 5% to 10% compared to a state without the glass frit or the material derived from the glass frit.

According to one embodiment of the present specification, the content of the glass frit or the material derived from the glass frit may be greater than or equal to 0.01% by weight and less than or equal to 10% by weight with respect to the total weight of the electrolyte.

Having the content of the glass frit or the material derived from the glass frit within the above-mentioned range not only enhances density of an electrolyte, but minimizes a side reaction caused by the glass frit or the material derived from the glass frit in the electrolyte. Specifically, when the content is greater than the above-mentioned range, there may be problems in that ion conductivity of an electrolyte decreases and defect areas may occur. In addition, when the content is less than the above-mentioned range, there may be a problem in that an effect of enhancing electrolyte density due to the glass frit or the material derived from the glass frit may not be exhibited.

According to one embodiment of the present specification, the material derived from the glass frit may be the glass frit melted and then re-solidified. Specifically, the material derived from the glass frit may be the glass frit material melted and then re-solidified by being included in the air electrode, the fuel electrode and/or the electrolyte and gone through a sintering process. In addition, according to one embodiment of the present specification, the material derived from the glass frit may include the electrolyte material while the glass frit is melted, mixed with the electrolyte material, and then re-solidified.

According to one embodiment of the present specification, the glass frit may form an electrolyte with the electrolyte material in the electrolyte by being included in the electrolyte, and the glass frit may allow the electrolyte to be formed in a denser structure and may perform a role of having the electrolyte material being tightly bound.

In addition, according to one embodiment of the present specification, the glass frit is in a fluid state after being included in the electrolyte and then gone through a sintering process, and may be re-solidified after being transferred to the fuel electrode and/or the air electrode. In other words, according to one embodiment of the present specification, the glass frit or the material derived from the glass frit may be included not only in the electrolyte, but in the air electrode and/or the fuel electrode.

According to one embodiment of the present specification, the electrolyte may have porosity of greater than or equal to 0% and less than or equal to 5%. Specifically, performance of a solid oxide fuel cell is more superior as the electrolyte has porosity closer to 0%. This is due to the fact that efficiency may decline when gas shift occurs in the electrolyte.

According to one embodiment of the present specification, the solid oxide fuel cell may be manufactured by simultaneous baking, and therefore, may minimize distortion at interfaces between each constitution. In other words, binding power of each constitution at the junction may be excellent.

According to one embodiment of the present specification, the electrolyte may include a solid oxide having ion conductivity. Specifically, according to one embodiment of the present specification, the electrolyte may include a complex metal oxide including one or more types selected from the group consisting of zirconium oxide-based, cerium oxide-based, lanthanum oxide-based, titanium oxide-based and bismuth oxide-based materials. More specifically, the electrolyte may include yttria-stabilized zirconia (YSZ), scandia-stabilized zirconia (ScSZ), samaria-doped ceria (SDC), gadolinia-doped ceria (GDC).

The YSZ is a yttria-stabilized zirconium oxide and may be expressed as $(Y_2O_3)_x(ZrO_2)_{1-x}$, and x may be from 0.05 to 0.15.

The ScSZ is a scandia-stabilized zirconium oxide and may be expressed as $(Sc_2O_3)_x(ZrO_2)_{1-x}$, and x may be from 0.05 to 0.15.

The SDC is samaria-doped ceria and may be expressed as $(Sm_2O_3)_x(CeO_2)_{1-x}$, and x may be from 0.02 to 0.4.

The GDC is gadolinia-doped ceria and may be expressed as $(Gd_2O_3)_x(CeO_2)_{1-x}$, and x may be from 0.02 to 0.4.

According to one embodiment of the present specification, the electrolyte may have a thickness of greater than or equal to 10 nm and less than or equal to 100 μm. More specifically, the thickness may be greater than or equal to 100 nm and less than or equal to 50 μm.

According to one embodiment of the present specification, the air electrode may include a metal oxide. Specifically, the air electrode may use metal oxide particles having a perovskite-type crystal structure and include metal oxide particles such as $(Sm,Sr)CoO_3$, $(La,Sr)MnO_3$, $(La,Sr)CoO_3$, $(La,Sr)(Fe,Co)O_3$ and $(La,Sr)(Fe,Co,Ni)O_3$, and the metal oxide may be included in the fuel electrode by being used either alone or as mixture of two or more types. In addition, according to one embodiment of the present specification, precious metals such as platinum, ruthenium and palladium may be included as a material forming the air electrode. Furthermore, as a material forming the air electrode, lanthanum manganite doped with strontium, cobalt, iron and the like may be used. For example, the air electrode may include $La_{0.8}Sr_{0.2}MnO_3$ (LSM), $La_{0.6}Sr_{0.4}Co_{0.8}Fe_{0.2}O_3$ (LSCF), and the like.

According to one embodiment of the present specification, the fuel electrode may use cermet mixed with the material included in the electrolyte described above and nickel oxide. Furthermore, the fuel electrode may additionally include active carbon.

According to one embodiment of the present specification, the solid oxide fuel cell includes a stack including an interconnect connecting two or more unit cells to each other; a fuel supply unit supplying fuel to the stack; and an air supply unit supplying air to the stack, wherein the unit cell may include the solid oxide fuel cell.

According to one embodiment of the present specification, the fuel electrode may include an anode support layer (ASL) and an anode functional layer (AFL). The AFL may be a porous membrane, and may be provided between the ASL and the electrolyte membrane. More specifically, the ASL may be a region in which an electrochemical reaction occurs by being brought into contact with the electrolyte membrane.

According to one embodiment of the present specification, the ASL performs a role of an anode support layer, and for this, may be formed to be relatively thicker compared to the AFL. In addition, the ASL allows fuel to smoothly reach the AFL, and may be formed to have excellent electric conductivity.

According to one embodiment of the present specification, the air electrode may include a cathode support layer (CSL) and a cathode functional layer (CFL).

According to one embodiment of the present specification, the CFL may be a porous membrane, and may be provided between the CSL and the electrolyte membrane. More specifically, the CSL may be a region in which an electrochemical reaction occurs by being brought into contact with the electrolyte membrane.

According to one embodiment of the present specification, the CSL performs a role of a cathode support layer, and for this, may be formed to be relatively thicker compared to the CFL. In addition, the CSL allows air to smoothly reach the CFL, and may be formed to have excellent electric conductivity.

According to one embodiment of the present specification, the interconnect may include a fuel flow path through which fuel may flow to each unit cell and an air flow path through which air may flow to each unit cell.

According to one embodiment of the present specification, the stack may be a stack of two or more unit cells. In addition, the interconnect may include a fuel flow path and an air flow path connecting each unit cell.

According to one embodiment of the present specification, each unit cell may be series-laminated in the stack, and a separator electrically connecting the unit cells may be further provided between the unit cells.

According to one embodiment of the present specification, the solid oxide fuel cell may be a flat plate-type, a cylinder-type or a flat-tube type.

One embodiment of the present specification provides a method for manufacturing a solid oxide fuel cell including preparing an air electrode precursor; preparing an electrolyte precursor; preparing a fuel electrode precursor; providing the electrolyte precursor between the air electrode precursor and the fuel electrode precursor; and baking the air electrode precursor, the electrolyte precursor and the fuel electrode precursor simultaneously, wherein at least one of the air electrode precursor, the electrolyte precursor and the fuel electrode precursor includes a glass frit.

According to one embodiment of the present specification, a temperature of the baking may be greater than or equal to 800° C. and less than or equal to 1,600° C. Specifically, according to one embodiment of the present specification, a temperature of the baking may be greater than or equal to 1,000° C. and less than or equal to 1,400° C.

In the method for manufacturing a solid oxide fuel cell according to one embodiment of the present specification, the electrolyte precursor may include a glass frit.

According to one embodiment of the present specification, the baking may include the glass frit being melted and then re-solidified.

According to one embodiment of the present specification, the preparing of an air electrode precursor; the preparing of an electrolyte precursor; and the preparing of a fuel electrode precursor may each independently include forming a membrane using a tape casting method or a screen printing method, and then drying the membrane.

Hereinafter, the present specification will be described in detail with reference to examples. However, the examples according to the present specification may be modified to various other forms, and the scope of the present specification is not interpreted to be limited to the examples described below. The examples of the present specification are provided in order to more completely describe the present specification for those having average knowledge in the art.

EXAMPLE 1

An air electrode precursor, YSZ as an electrolyte precursor including a $La_2O_3$—$B_2O_3$—$BaO$—$TiO_2$-based glass frit in 5% by weight with respect to the whole electrolyte precursor, and a fuel electrode precursor were each formed as a membrane using a tape casting method, and consecutively laminated. Furthermore, the laminated membrane was baked at a temperature of 1,350° C. to manufacture a solid oxide fuel cell. Then, in order to examine density of the electrolyte membrane of the manufactured solid oxide fuel cell, the electrolyte section was identified using a scanning electron microscopy (SEM).

FIG. 2 shows a SEM image according to Example 1.

EXAMPLE 2

A solid oxide fuel cell was manufactured in the same manner as in Example 1 except that the content of the glass frit was 10% by weight, and the electrolyte section was identified using a scanning electron microscopy (SEM).

FIG. 3 shows a SEM image according to Example 2.

COMPARATIVE EXAMPLE 1

A solid oxide fuel cell was manufactured in the same manner as in Example 1 except that the glass frit was not included, and the electrolyte section was identified using a scanning electron microscopy (SEM).

FIG. 4 shows a SEM image according to Comparative Example 1.

EXAMPLE 3

An air electrode precursor, YSZ as an electrolyte precursor including a $La_2O_3$—$B_2O_3$—$BaO$—$TiO_2$-based glass frit in 5% by weight with respect to the whole electrolyte precursor, and a fuel electrode precursor were each formed as a membrane using a tape casting method, and consecutively laminated. Furthermore, the laminated membrane was baked at a temperature of 1,250° C. to manufacture a solid oxide fuel cell. Then, in order to examine density of the electrolyte membrane of the manufactured solid oxide fuel cell, the electrolyte section was identified using a scanning electron microscopy (SEM).

FIG. 5 shows a SEM image according to Example 3.

EXAMPLE 4

A solid oxide fuel cell was manufactured in the same manner as in Example 3 except that the content of the glass frit was 10% by weight, and the electrolyte section was identified using a scanning electron microscopy (SEM).

FIG. 6 shows a SEM image according to Example 4.

COMPARATIVE EXAMPLE 2

A solid oxide fuel cell was manufactured in the same manner as in Example 3 except that the glass frit was not included, and the electrolyte section was identified using a scanning electron microscopy (SEM).

FIG. 7 shows a SEM image according to Comparative Example 2.

EXAMPLE 5

An air electrode precursor, GDC as an electrolyte precursor including a $La_2O_3$—$B_2O_3$—$BaO$—$TiO_2$-based glass frit in 5% by weight with respect to the whole electrolyte precursor, and a fuel electrode precursor were each formed as a membrane using a tape casting method, and consecutively laminated. Furthermore, the laminated membrane was baked at a temperature of 1,350° C. to manufacture a solid oxide fuel cell. Then, in order to examine density of the electrolyte membrane of the manufactured solid oxide fuel cell, the electrolyte section was identified using a scanning electron microscopy (SEM).

FIG. 8 shows a SEM image according to Example 5.

EXAMPLE 6

A solid oxide fuel cell was manufactured in the same manner as in Example 5 except that the content of the glass frit was 10% by weight, and the electrolyte section was identified using a scanning electron microscopy (SEM).

FIG. 9 shows a SEM image according to Example 6.

COMPARATIVE EXAMPLE 3

A solid oxide fuel cell was manufactured in the same manner as in Example 5 except that the glass frit was not included, and the electrolyte section was identified using a scanning electron microscopy (SEM).

FIG. 10 shows a SEM image according to Comparative Example 3.

When examining the examples and the comparative examples, it was seen that the section of the electrolyte baked with the glass frit was formed in a denser structure than the section of the electrolyte baked without the glass frit.

It was seen from the SEM image of Example 4 that the electrolyte having a denser structure was formed even when baked at a temperature of 1,250° C., compared to Comparative Example 1 baked at 1,350° C.

The invention claimed is:

1. A method for manufacturing a solid oxide fuel cell comprising:
   preparing an air electrode precursor;
   preparing an electrolyte precursor;
   preparing a fuel electrode precursor;
   providing the electrolyte precursor between the air electrode precursor and the fuel electrode precursor; and
   baking the air electrode precursor, the electrolyte precursor and the fuel electrode precursor simultaneously,
   wherein the electrolyte precursor includes a glass frit.

2. The method for manufacturing a solid oxide fuel cell of claim 1, wherein a temperature of the baking is greater than or equal to 800° C. and less than or equal to 1,600° C.

3. The method for manufacturing a solid oxide fuel cell of claim 1, wherein the preparing of an air electrode precursor; the preparing of an electrolyte precursor; and the preparing of a fuel electrode precursor each independently include forming a membrane using a tape casting method or a screen printing method, and then drying the membrane.

4. The method of claim 1, wherein the air electrode precursor includes the glass frit.

5. The method of claim 1, wherein the fuel electrode precursor includes the glass frit.

6. The method of claim 1, wherein the fuel electrode precursor and the air electrode precursor include the glass frit.

\* \* \* \* \*